(12) United States Patent
Sato et al.

(10) Patent No.: US 10,464,605 B2
(45) Date of Patent: Nov. 5, 2019

(54) VEHICLE STEERING CONTROL DEVICE

(71) Applicant: NSK Ltd., Tokyo (JP)

(72) Inventors: Tomonori Sato, Gunma (JP); Sakae Nejo, Gunma (JP); Nobuhiro Mitsuishi, Gunma (JP); Sumio Sugita, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/072,073

(22) PCT Filed: Feb. 9, 2017

(86) PCT No.: PCT/JP2017/004784
§ 371 (c)(1),
(2) Date: Jul. 23, 2018

(87) PCT Pub. No.: WO2017/141819
PCT Pub. Date: Aug. 24, 2017

(65) Prior Publication Data
US 2019/0039650 A1 Feb. 7, 2019

(30) Foreign Application Priority Data

Feb. 17, 2016 (JP) ................................ 2016-028276
Feb. 17, 2016 (JP) ................................ 2016-028277

(51) Int. Cl.
*B62D 15/02* (2006.01)
*B62D 6/00* (2006.01)
(Continued)

(52) U.S. Cl.
CPC ......... *B62D 15/0265* (2013.01); *B62D 5/008* (2013.01); *B62D 5/0463* (2013.01);
(Continued)

(58) Field of Classification Search
CPC . B62D 15/02; B62D 6/00; B62D 5/04; G05B 1/06
See application file for complete search history.

(56) References Cited

U.S. PATENT DOCUMENTS

2003/0100981 A1* 5/2003 Suzuki ................... B62D 5/049
701/43
2003/0111974 A1* 6/2003 Suzuki ................. B62D 5/0463
318/661
(Continued)

FOREIGN PATENT DOCUMENTS

DE 102011120778 A1 6/2013
JP 2006-076339 A 3/2006
(Continued)

OTHER PUBLICATIONS

Communication dated Jan. 3, 2019 from the European Patent Office in application No. 17753077.1.
(Continued)

*Primary Examiner* — Yuri Kan
(74) *Attorney, Agent, or Firm* — Sughrue Mion, PLLC

(57) ABSTRACT

To provide a vehicle steering control device capable of suppressing influence of a torque generated during driving support by an EPS device on steering of a steering wheel performed by a driver. The vehicle steering control device includes an EPS controller (first controller) that controls a speed reduction mechanism and a differential mechanism controller (second controller) that controls a differential mechanism. In addition, the vehicle steering control device has a first steering assist mode of assisting driver's steering and a second steering assist mode of performing steering independently from the driver's steering. In the second steering assist mode, the second controller controls the differential mechanism so as to cancel a torque applied to a (Continued)

rack-and-pinion side of the differential mechanism from the speed reduction mechanism controlled by the first controller.

4 Claims, 9 Drawing Sheets

(51) Int. Cl.
*G05B 1/06* (2006.01)
*B62D 5/04* (2006.01)
*B62D 5/00* (2006.01)

(52) U.S. Cl.
CPC ............ *B62D 5/0472* (2013.01); *B62D 6/002* (2013.01); *B62D 6/003* (2013.01); *B62D 6/008* (2013.01); *B62D 15/025* (2013.01)

(56) References Cited

U.S. PATENT DOCUMENTS

| | | | | |
|---|---|---|---|---|
| 2012/0277956 | A1* | 11/2012 | Sasaki | ................... B62D 7/159 |
| | | | | 701/41 |
| 2015/0353134 | A1* | 12/2015 | Morotomi | .......... B62D 15/0265 |
| | | | | 701/41 |
| 2019/0023318 | A1* | 1/2019 | Mitsuishi | ............. B62D 5/0463 |

FOREIGN PATENT DOCUMENTS

| | | |
|---|---|---|
| JP | 2012-056399 A | 3/2012 |
| WO | 2014/128832 A1 | 8/2014 |

OTHER PUBLICATIONS

International Preliminary Report on Patentability of PCT/JP2017/004784 dated Mar. 9, 2018.

* cited by examiner

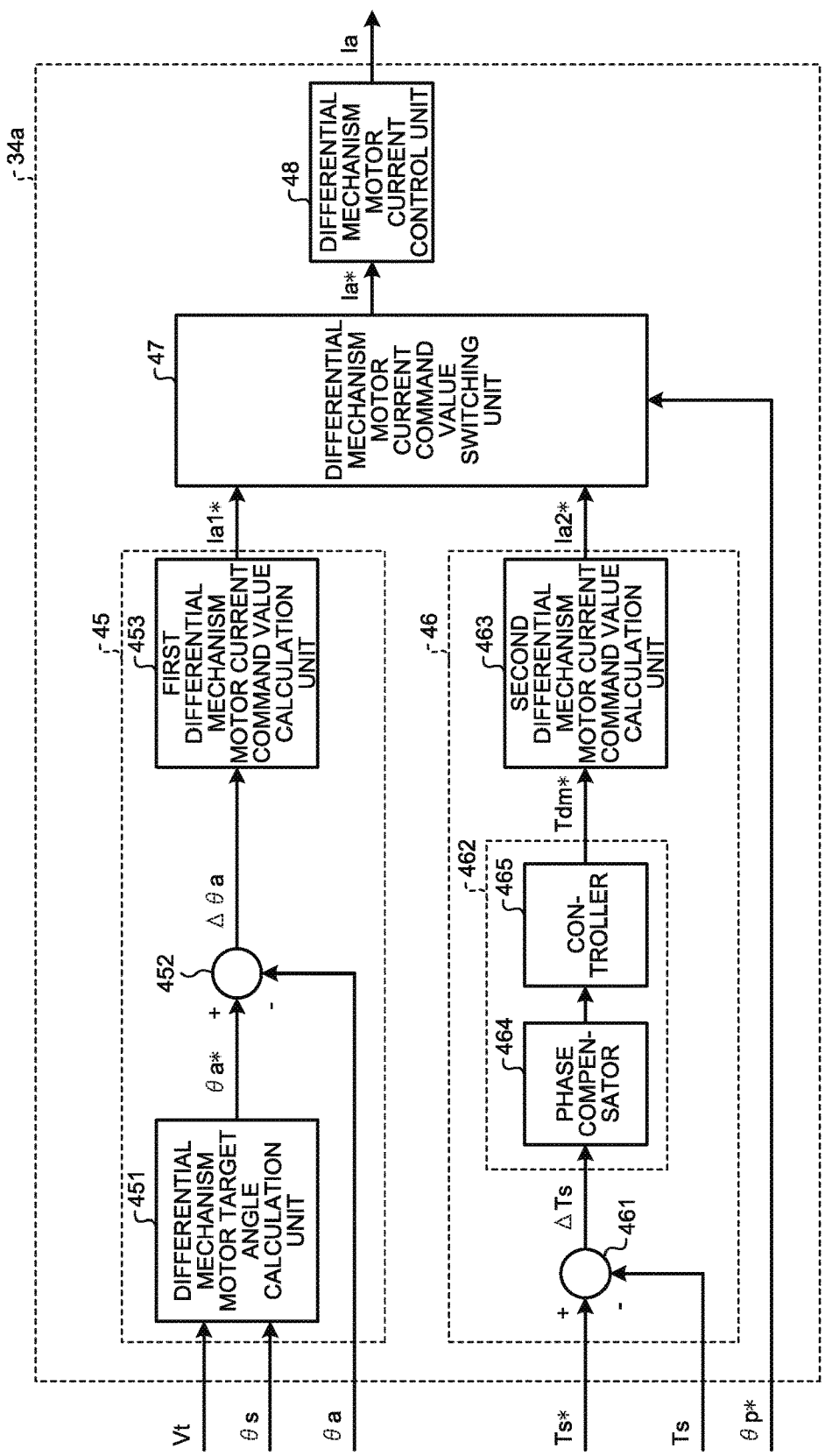

VEHICLE STEERING CONTROL DEVICE

CROSS REFERENCE TO RELATED APPLICATIONS

This application is a National Stage of International Application No. PCT/JP2017/004784 filed Feb. 9, 2017, claiming priority based on Japanese Patent Application No. 2016-028276 filed Feb. 17, 2016 and Japanese Patent Application No. 2016-028277 filed Feb. 17, 2016.

FIELD

The present invention relates to a vehicle steering control device.

BACKGROUND

There is a so-called electric power steering (EPS) device that assists steering using a steering assist motor in order to reduce a vehicle steering force in so-called automobiles such as passenger cars and trucks. In the EPS device, a driving force of a steering assist motor is applied, as an assist force, to a steering shaft or a rack shaft by a transmission mechanism, which is a gear, a belt, or the like, via a decelerator. For the purpose of enabling a steering angle ratio, which is a ratio of a steering angle of a steering wheel and a steered angle of a drive wheel, to be variably controlled and lowering a risk of a collision with an object around the vehicle in such an EPS device, a technique of changing the steering angle ratio in accordance with a distance from the object, a relative speed, and a distance until reaching the object is disclosed (for example, see Patent Literature 1).

CITATION LIST

Patent Literature

Patent Literature 1: JP 2012-056399 A

SUMMARY

Technical Problem

In recent years, the EPS device is adapted not only for steering assist to reduce a steering force of a vehicle but also for automatic steering for the purpose of avoiding a collision of a vehicle, for example. That is, for example, when an obstacle is detected by a sensor mounted on the vehicle, the EPS device controls a drive wheel to perform emergency avoidance steering to avoid a collision with the obstacle. At this time, a torque obtained by multiplying angular acceleration displacement generated by the EPS device by inertia is transmitted to the steering wheel. The torque generated by active driving support by the EPS device is a torque that is not intended by a driver, which is a factor that makes the driver feel discomfort and unease. In addition, when the torque generated by active driving support by the EPS device exceeds a torque of steering performed by the driver, there is a possibility that the steering wheel may rotate off the driver's hand.

The present invention has been made in view of the above description, and an object thereof is to provide a vehicle steering control device capable of suppressing influence of a torque generated during automatic steering by an EPS device on steering of a steering wheel performed by a driver.

Solution to Problem

To solve the above problem and achieve the above object, a vehicle steering control device includes a first controller that controls a speed reduction mechanism in a steering mechanism in which a steering wheel and a rack-and-pinion that steers and drives a drive wheel are connected via a differential mechanism and the speed reduction mechanism is provided between the rack-and-pinion and the drive wheel, and a second controller that controls the differential mechanism in the steering mechanism. A first steering assist mode of assisting steering of a driver and a second steering assist mode of performing steering independently from the steering of the driver are provided as operation modes of the first controller and the second controller, and the second controller controls the differential mechanism so as to cancel a torque applied to a side of the rack-and-pinion of the differential mechanism from the speed reduction mechanism controlled by the first controller in the second steering assist mode.

With the above configuration, it is possible to suppress the influence of the torque generated in the second steering assist mode on the steering of the steering wheel performed by the driver.

Further, as a desirable embodiment, the second controller preferably controls the differential mechanism such that angular displacement on a side of the steering wheel is smaller than angular displacement on the side of the rack-and-pinion in the second steering assist mode.

As a result, it is possible to suppress the angular displacement on the steering wheel side in the second steering assist mode.

Further, as a desirable embodiment, a first ratio of an angle on the side of the steering wheel of the differential mechanism relative to an angle on the side of the rack-and-pinion of the differential mechanism is preferably set in the second controller, and the second controller preferably controls the differential mechanism based on the angle on the side of the steering wheel of the differential mechanism and the first ratio in the second steering assist mode.

With the above configuration, it is possible to implement the steering angle displacement suppression control in which the angular displacement of the angle of the steering wheel side of the differential mechanism is made smaller than the angular displacement of the angle of the steering wheel side of the differential mechanism in the second steering assist mode.

Further, a second ratio, different from the first ratio, of the angle on the side of the steering wheel of the differential mechanism relative to the angle on the side of the rack-and-pinion of the differential mechanism may be set in the second controller, and the second controller may control the differential mechanism based on the angle on the side of the steering wheel of the differential mechanism and the second ratio in the first steering assist mode.

Further, as a desirable embodiment, the second controller preferably controls the differential mechanism by switching the first ratio and the second ratio.

With the above configuration, it is possible to implement the angle control of the differential mechanism in the second steering assist mode and the angle control of the differential mechanism in the first steering assist mode using the single second controller.

Further, as a desirable embodiment, the second ratio is preferably set in accordance with a vehicle speed in the first steering assist mode in the second controller.

With the above configuration, it is possible to implement the appropriate steering assist control in accordance with the vehicle speed in the first steering assist mode.

Further, as a desirable embodiment, a torque sensor that detects a torque on a side of the steering wheel of the differential mechanism is preferably provided. The second controller preferably controls the differential mechanism such that a steering torque detected by the torque sensor becomes a predetermined target steering torque in the second steering assist mode.

With the above configuration, it is possible to cancel the torque applied to the rack-and-pinion side of the differential mechanism from the speed reduction mechanism controlled by the first controller.

Further, the first steering assist mode and the second steering assist mode switched based on an external command.

Advantageous Effects of Invention

According to the present invention, it is possible to provide the vehicle steering control device capable of suppressing the influence of the torque generated during driving support by the EPS device on the steering of the steering wheel performed by the driver.

BRIEF DESCRIPTION OF DRAWINGS

FIG. 8 is a diagram illustrating an example of an internal functional configuration of a differential mechanism controller of the vehicle steering control device according to the second embodiment.

DESCRIPTION OF EMBODIMENTS

Modes for carrying out the present invention (embodiments) will be described in detail with reference to the drawings. The present invention is not limited by the content described in the following embodiments. In addition, constituent elements to be described hereinafter include one which can be easily assumed by those skilled in the art and one which is substantially the same. Further, the constituent elements to be described hereinafter can be appropriately combined.

First Embodiment

Figure 1:
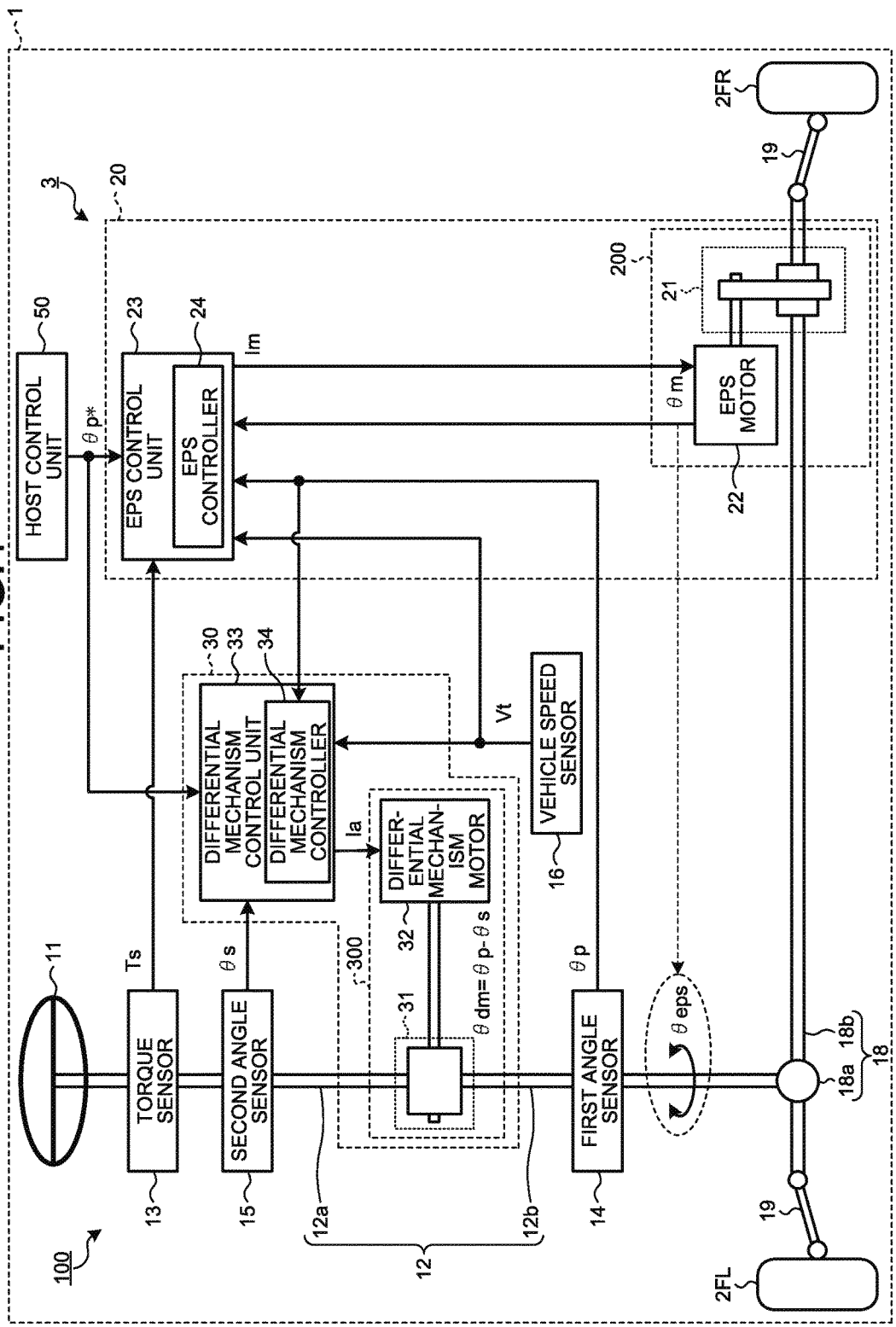
FIG. 1 is a diagram illustrating a configuration example of a vehicle steering control device according to a first embodiment.

FIG. 1 is a diagram illustrating a configuration example of a vehicle steering control device according to a first embodiment. In the example illustrated in FIG. 1, a left drive wheel 2FL and a right drive wheel 2FR, which are left and right drive wheels, are steered by steering of a steering wheel 11 performed by a driver and control by a vehicle steering control device 3 in a vehicle 1. The steering wheel 11, the left drive wheel 2FL, and the right drive wheel 2FR are connected via a steerable shaft 12, a rack-and-pinion 18, and tie rods 19, thereby constituting a steering mechanism 100.

The rack-and-pinion 18 is constituted by a pinion 18a and a rack 18b and steers and drives the left drive wheel 2FL and the right drive wheel 2FR connected to both ends of the rack 18b, respectively, via the tie rods 19.

The steerable shaft 12 is constituted by a steering shaft 12a on the steering wheel 11 side and a pinion shaft 12b on the rack-and-pinion 18 side, and the steering shaft 12a and the pinion shaft 12b are mechanically connected via a differential mechanism 31 to be described later. Incidentally, each of the steering shaft 12a and the pinion shaft 12b may be configured by connecting a plurality of torsion bars via a universal joint.

The pinion shaft 12b is provided with a first angle sensor 14. The first angle sensor 14 detects a pinion angle θp which is a mechanical angle of the pinion shaft 12b. The first angle sensor 14 can be configured using, for example, an absolute angle sensor, a relative angle sensor, a resolver, or the like. Incidentally, when the first angle sensor 14 is configured using the relative angle sensor, the resolver, or the like, it is necessary to obtain the pinion angle θp by converting a relative angle into an absolute angle in the subsequent stage.

The steering shaft 12a is provided with a second angle sensor 15. The second angle sensor 15 detects a steering angle θs which is a mechanical angle of the steering shaft 12a. The second angle sensor 15 can be configured using, for example, an absolute angle sensor, a relative angle sensor, a resolver, or the like. Incidentally, when the second angle sensor 15 is configured using the relative angle sensor, the resolver, or the like, it is necessary to obtain the steering angle θs by converting a relative angle into an absolute angle in the subsequent stage.

In addition, the steering shaft 12a is provided with a torque sensor 13. The torque sensor 13 detects a steering torque Ts applied to the steering shaft 12a.

As illustrated in FIG. 1, the vehicle steering control device 3 according to the first embodiment is configured to include an electric power steering (EPS) device 20 and a differential device 30. In the present embodiment, the vehicle steering control device 3 has a first steering assist mode of assisting a driver's steering at the time of normal steering of a vehicle 1 and a second steering assist mode of performing automatic steering independently from the driver's steering at the time of emergency avoidance steering or the like to avoid a collision between the vehicle 1 and an obstacle, for example, as operation modes. The vehicle steering control device 3 switches from the first steering assist mode to the second steering assist mode as a target pinion angle θp* is input from an automatic steering control unit (host control unit) 50. Incidentally, the vehicle steering control device 3 may be configured such that a signal for switching between the first steering assist mode and the second steering assist mode is input from the automatic steering control unit (host control unit) 50 other than the target pinion angle θp*. In addition, the automatic steering control unit (host control unit) 50 can seamlessly switch between the first steering assist mode and the second steering assist mode based on information from various sensors, for example, an obstacle detection sensor (not illustrated) or the like. For example, the second steering assist mode is turned on when the obstacle sensor has detected an obstacle in a traveling direction of the vehicle 1.

In the example illustrated in FIG. 1, the EPS device 20 is a so-called rack assist type electric power steering device that applies an assist force to the rack 18b. The EPS device 20 is configured to include a speed reduction mechanism 21, an EPS motor 22, and an EPS control unit 23. The speed reduction mechanism 21 and the EPS motor 22 constitute an EPS actuator 200. Incidentally, the present invention is not limited by the configuration of the speed reduction mechanism 21 and the configuration of the EPS motor 22.

An EPS controller (first controller) 24 for controlling the speed reduction mechanism 21 is incorporated in the EPS control unit 23. In the first steering assist mode, the EPS controller 24 performs current control to apply a desired assist torque to the steerable shaft 12, thereby applying an EPS motor current Im to the EPS motor 22. In addition, the EPS control unit 23 performs current control based on the target pinion angle θp* from the host control unit 50 and the steering torque Ts detected by the torque sensor 13 in the second steering assist mode, thereby applying the EPS motor current Im to the EPS motor 22. At this time, an angular displacement (hereinafter referred to as "EPS actuator angle") θeps in accordance with an angular acceleration of the EPS motor 22 is generated on the pinion shaft 12b.

The differential device 30 is configured to include a differential mechanism 31, a differential mechanism motor 32, and a differential mechanism control unit 33. The differential mechanism 31 and the differential mechanism motor 32 constitute a differential mechanism actuator 300. The differential mechanism 31 may be, for example, a steering angle ratio varying mechanism, or may be configured to have a structure such as a torque limiter and an electromagnetic clutch. The present invention is not limited by the configurations of the differential mechanism 31 and the differential mechanism motor 32.

A differential mechanism controller (second controller) 34 for controlling the differential mechanism 31 is incorporated in the differential mechanism control unit 33. As the differential mechanism controller 34 performs current control of the differential mechanism motor 32, an angular difference (hereinafter referred to as a "differential mechanism actuator angle") θdm is generated by the differential mechanism 31 provided between the pinion shaft 12b and the steering shaft 12a. The differential mechanism controller 34 will be described later.

Figure 2:
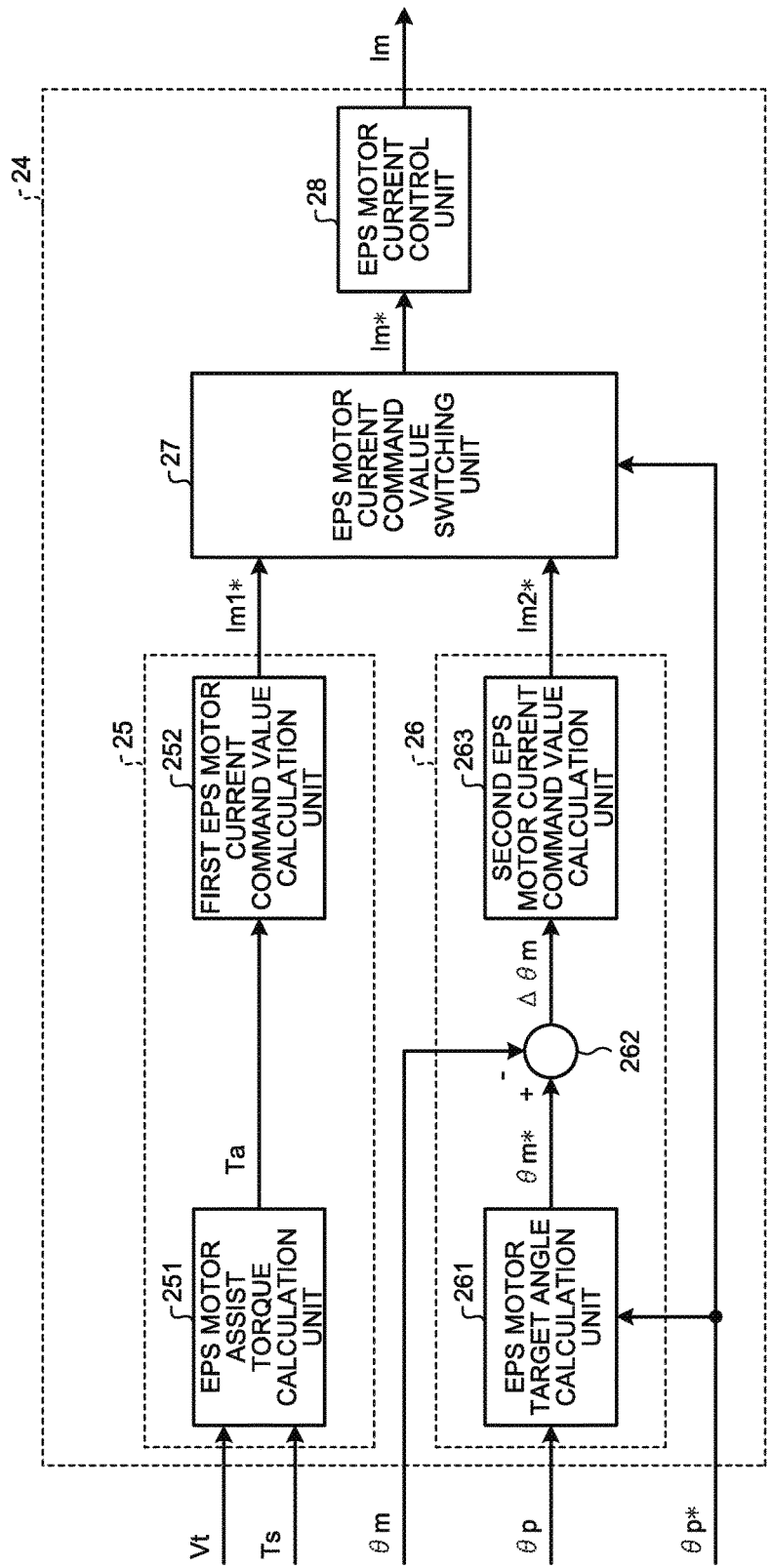
FIG. 2 is a diagram illustrating an example of an internal functional configuration of an EPS controller of the vehicle steering control device according to the first embodiment.

FIG. 2 is a diagram illustrating an example of an internal functional configuration of the EPS controller of the vehicle steering control device according to the first embodiment.

The EPS controller 24 is configured to include an EPS assist control unit 25, an EPS motor angle control unit 26, an EPS motor current command value switching unit 27, and an EPS motor current control unit 28. A vehicle speed Vt detected by a vehicle speed sensor 16, the pinion angle θp detected by the first angle sensor 14, the steering torque Ts detected by the torque sensor 13, an EPS motor angle θm from the EPS motor 22, and the target pinion angle θp* from the automatic steering control unit (host control unit) 50 are input to the EPS controller 24.

The EPS assist control unit 25 includes an EPS motor assist torque calculation unit 251 and a first EPS motor current command value calculation unit 252.

In the first steering assist mode, the EPS motor assist torque calculation unit 251 obtains the assist torque Ta as the EPS actuator 200 based on the vehicle speed Vt and the steering torque Ts, and outputs the obtained assist torque Ta to the first EPS motor current command value calculation unit 252.

The first EPS motor current command value calculation unit 252 obtains a current command value (first EPS motor current command value) Im1* of the EPS motor 22, necessary to obtain the assist torque Ta, and outputs the obtained current command value Im1* to the EPS motor current command value switching unit 27.

The EPS motor angle control unit 26 includes an EPS motor target angle calculation unit 261, an adder 262, and a second EPS motor current command value calculation unit 263.

In the second steering assist mode, the EPS motor target angle calculation unit 261 obtains an EPS motor target angle θm*, necessary in the second steering assist mode, based on the target pinion angle θp* and the pinion angle θp. More specifically, the EPS motor target angle calculation unit 261 obtains an angular deviation of the pinion angle θp with respect to the target pinion angle θp* and obtains an EPS actuator target angle θeps* necessary to offset the angular deviation. Further, the EPS motor target angle calculation unit 261 obtains the EPS motor target angle θm* corresponding to the obtained EPS actuator target angle θeps*, and outputs the obtained EPS motor target angle θm* to the adder 262.

The adder 262 obtains an angular deviation Δθm between the EPS motor target angle θm* and the EPS motor angle θm and outputs the obtained angular deviation Δθm to the second EPS motor current command value calculation unit 263.

The second EPS motor current command value calculation unit 263 obtains a current command value (second EPS motor current command value) Im2* of the EPS motor 22, necessary to offset the angular deviation Δθm between the EPS motor target angle θm* and the EPS motor angle θm, and outputs the obtained current command value Im2* to the EPS motor current command value switching unit 27.

In accordance with the target pinion angle θp*, the EPS motor current command value switching unit 27 outputs the first EPS motor current command value Im1* output from the EPS assist control unit 25 and the second EPS motor current command value Im2* output from the EPS motor angle control unit 26 in a switching manner as an EPS motor current command value Im*. More specifically, when the target pinion angle θp* has not been input from the automatic steering control unit (host control unit) 50, the EPS motor current command value switching unit 27 outputs the first EPS motor current command value Im1* to the EPS motor current control unit 28 as the EPS motor current command value Im* assuming that the operation mode is the first steering assist mode. In addition, when the target pinion angle θp* has been input from the automatic steering control unit (host control unit) 50, the EPS motor current command value switching unit 27 outputs the second EPS motor current command value Im2* to the EPS motor current control unit 28 as the EPS motor current command value Im* assuming that the operation mode is the second steering assist mode.

The EPS motor current control unit 28 generates the EPS motor current Im in accordance with the EPS motor current command value Im* output from the EPS motor current command value switching unit 27 and applies the generated EPS motor current Im to the EPS motor 22.

That is, the EPS controller 24 performs the current control of the EPS motor 22 so as to obtain the assist torque Ta in accordance with the steering torque Ts at the vehicle speed Vt in the first steering assist mode, thereby performing torque control of the EPS actuator 200. In addition, the EPS controller 24 performs the current control of the EPS motor 22 so as to follow the target pinion angle θp* input from the automatic steering control unit (host control unit) 50 in the second steering assist mode, thereby performing angle control of the EPS actuator 200.

Figure 3:
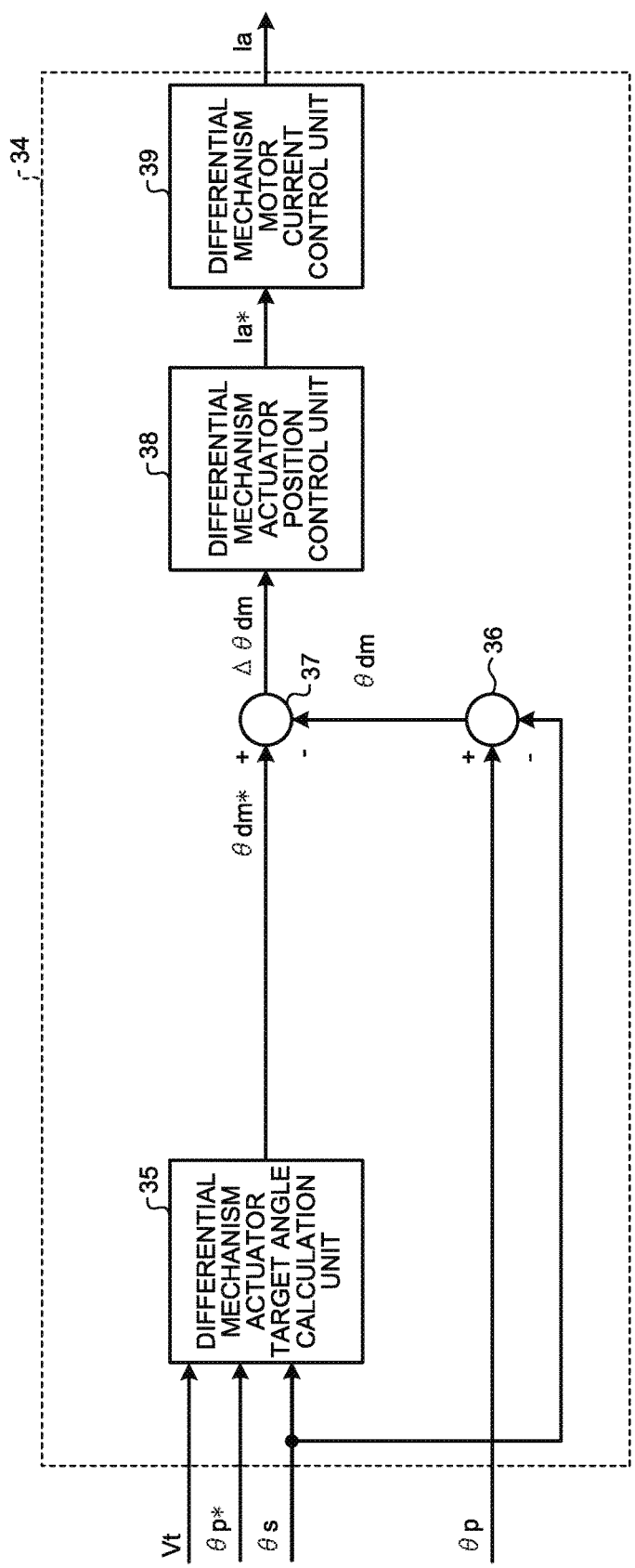
FIG. 3 is a diagram illustrating an example of an internal functional configuration of a differential mechanism controller of the vehicle steering control device according to the first embodiment.

FIG. 3 is a diagram illustrating an example of an internal functional configuration of the differential mechanism controller of the vehicle steering control device according to the first embodiment.

The differential mechanism controller 34 is configured to include a differential mechanism actuator target angle calculation unit 35, adders 36 and 37, a differential mechanism actuator position control unit 38, and a differential mechanism motor current control unit 39.

The pinion angle θp detected by the first angle sensor 14, the steering angle θs detected by the second angle sensor 15, the vehicle speed Vt detected by the vehicle speed sensor 16, and the target pinion angle θp* from the automatic steering control unit (host control unit) 50 are input to the differential mechanism controller 34.

The differential mechanism controller 34 according to the present embodiment implements steering assist control in accordance with the vehicle speed Vt in the first steering assist mode, and implements steering angle displacement suppression control to suppress the angular displacement generated in the steering angle θs by the angle control of the differential mechanism actuator 300 in the second steering assist mode.

In the first steering assist mode, the differential mechanism actuator target angle calculation unit 35 obtains an angle command in the differential mechanism actuator 300, that is, a differential mechanism actuator target angle θdm* in the differential mechanism actuator target angle calculation unit 35 based on the vehicle speed Vt, the steering angle θs, and the target pinion angle θp*, and outputs the obtained angle command to the adder 37.

In addition, the differential mechanism actuator target angle calculation unit 35 obtains the differential mechanism actuator target angle θdm* based on the steering angle θs in the second steering assist mode, and outputs the obtained differential mechanism actuator target angle θdm* to the adder 37.

The adder 36 obtains a relative difference between the pinion angle θp and the steering angle θs and outputs the obtained relative difference to the adder 37. The relative difference between the pinion angle θp and the steering angle θs is a differential mechanism actuator angle θdm in the differential mechanism actuator 300.

The adder 37 obtains an angular deviation Δθdm between the differential mechanism actuator target angle θdm* output from the differential mechanism actuator target angle calculation unit 35 and the differential mechanism actuator angle θdm output from the adder 36, and outputs the obtained angular deviation Δθdm to the differential mechanism actuator position control unit 38.

The differential mechanism actuator position control unit 38 controls a position of the differential mechanism actuator 300 based on the angular deviation Δθdm between the differential mechanism actuator target angle θdm* and the differential mechanism actuator angle θdm. That is, the differential mechanism actuator position control unit 38 obtains a current command value (differential mechanism motor current command value) Ia* of the differential mechanism motor 32, necessary to offset the angular deviation Δθdm between the differential mechanism actuator target angle θdm* and the differential mechanism actuator angle θdm, and outputs the obtained current command value Ia* to the differential mechanism motor current control unit 39.

The differential mechanism motor current control unit 39 generates a differential mechanism motor current Ia in accordance with the differential mechanism motor current command value Ia* output from the differential mechanism actuator position control unit 38 and applies the generated differential mechanism motor current Ia to the differential mechanism motor 32.

Here, an operation concept of the differential mechanism controller 34 will be described.

Figure 4:
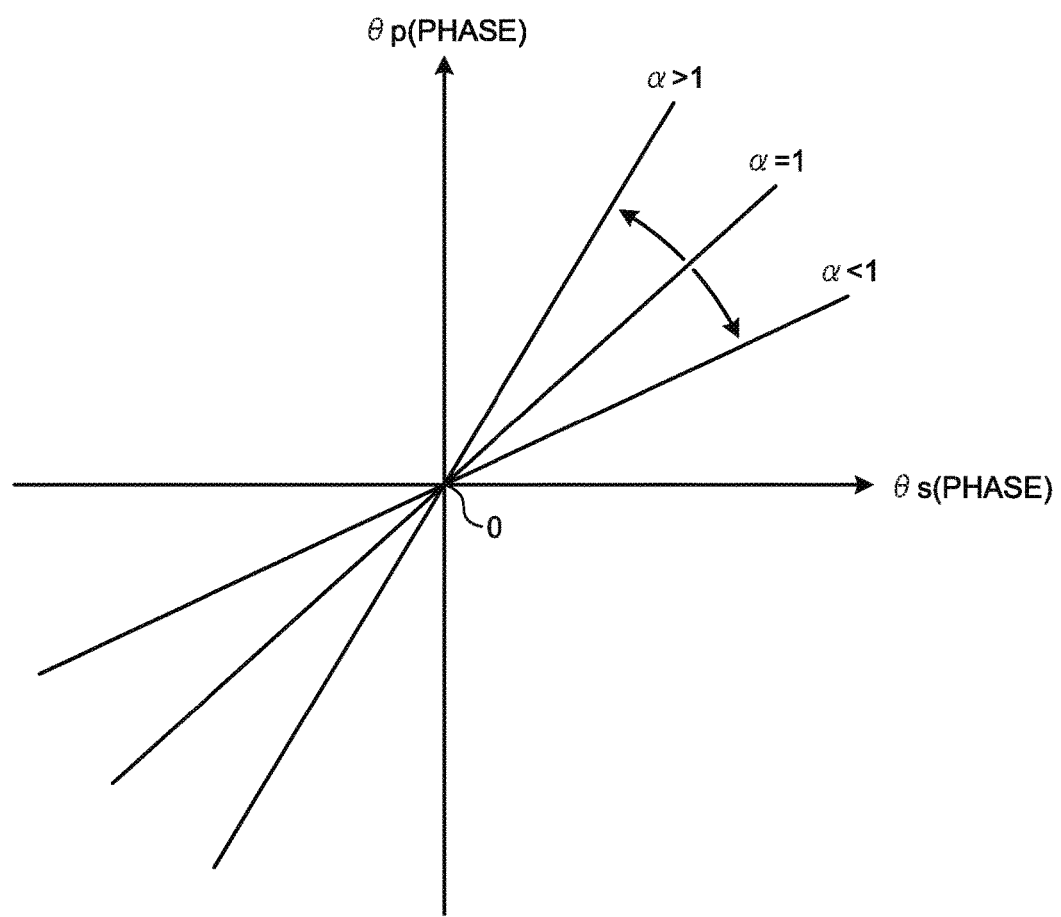
FIG. 4 is a graph illustrating a relationship between a pinion angle θp and a steering angle θs in the vehicle steering control device according to the first embodiment.

FIG. 4 is a graph illustrating a relationship between the pinion angle θp and the steering angle θs in the vehicle steering control device according to the first embodiment. In the example illustrated in FIG. 4, the horizontal axis represents the phase of the steering angle θs and the vertical axis represents the phase of the pinion angle θp. In addition, the right direction represents the rightward turning direction of the steering wheel 11 and the left direction represents the leftward turning direction of the steering wheel 11 in the example illustrated in FIG. 4. In the example illustrated in FIG. 4, the upward direction represents the rightward steered direction of each of the drive wheels 2FL and 2FR, and the downward direction represents the leftward steered direction of each of the drive wheels 2FL and 2FR.

In the example illustrated in FIG. 4, an example in which the correlation between the pinion angle θp and the steering angle θs at the arbitrary vehicle speed Vt is expressed by a primary straight line which passes through the origin (θp=0, θs=0) and in which the pinion angle θp and the steering angle θs have a proportional relationship with a positive inclination is illustrated. Incidentally, the example of the primary straight line in which the pinion angle θp and the steering angle θs have the proportional relationship with the positive inclination is illustrated in the example illustrated in FIG. 4, but it may be configured as a cubic curve that always has an inclination from zero to a positive value.

Here, the relationship between the pinion angle θp and the steering angle θs can be expressed by the following Formula (1).

$$\theta p = \alpha \theta s \qquad (1)$$

In the above Formula (1), α is a ratio of the pinion angle θp relative to the steering angle θs. The ratio α of the pinion angle θp relative to the steering angle θs can be set to an arbitrary value larger than zero.

As illustrated in FIG. 4, it is possible to obtain a large pinion angle θp with a small steering angle θs if the ratio α of the pinion angle θp relative to the steering angle θs is increased (α=1→α>1), and a larger steering angle θs is required to obtain a large pinion angle θp if the ratio α of the pinion angle θp relative to the steering angle θs is decreased (α=1→α<1). In general, the former is suitable for low-speed traveling, and the latter is suitable for high-speed traveling. That is, it is desirable to change the ratio α of the pinion angle θp relative to the steering angle θs in accordance with the vehicle speed Vt in the first steering assist mode.

In the vehicle steering control device 3 according to the present embodiment, the differential mechanism actuator angle θdm in the differential mechanism actuator 300 is superimposed. At this time, when assuming that a ratio between the steering angle θs and the pinion angle θp determined by the differential mechanism 31 is β and a ratio between the steering angle θs and the differential mechanism actuator angle θdm determined by the differential mechanism 31 is γ, the following Formula (2) is obtained.

$$\theta p = \beta \theta s + \gamma \theta dm \quad (2)$$

Here, the ratio β between the steering angle θs and the pinion angle θp and the ratio γ between the steering angle θs and the differential mechanism actuator angle θdm are constant values determined by the differential mechanism 31.

When the pinion angle θp is eliminated from the above Formulas (1) and (2), and the resultant is transformed as an expression of the differential mechanism actuator angle θdm, the following Formula (3) is obtained.

$$\theta dm = (\alpha - \beta) \times \theta s / \gamma \quad (3)$$

The right side in the above Formula (3) is the angle command in the differential mechanism actuator 300, that is, the differential mechanism actuator target angle θdm* in the differential mechanism actuator target angle calculation unit 35. As the differential mechanism actuator 300 is controlled such that the above Formula (3) is satisfied, the above Formula (1) is established.

In the first steering assist mode, the steering shaft 12a serves as an input shaft of the differential mechanism 31, and the pinion shaft 12b serves as an output shaft of the differential mechanism 31. That is, the steering angle θs is input to the differential mechanism 31, and the pinion angle θp is output therefrom.

On the other hand, the angular displacement is generated in the pinion shaft 12b by angle control of the EPS actuator 200 in the second steering assist mode. At this time, the pinion shaft 12b serves as the input shaft of the differential mechanism 31, and the steering shaft 12a of the differential mechanism 31 serves as the output shaft. That is, the pinion angle θp is input to the differential mechanism 31, and the steering angle θs is output therefrom. Therefore, when the above Formulas (1) and (2) are transformed as expressions of the steering angle θs, the following Formulas (4) and (5) are obtained.

$$\theta s = \theta p / \alpha \quad (4)$$

$$\theta s = (\theta p - \gamma \theta dm) / \beta \quad (5)$$

As is apparent from the above Formula (4), the steering angle θs is a value obtained by multiplying the pinion angle θp by a reciprocal of the ratio α of the pinion angle θp relative to the steering angle θs, that is, 1/α which is a ratio of the steering angle θs relative to the pinion angle θp. Therefore, it is possible to implement the steering angle displacement suppression control in which the angular displacement (steering angle displacement) generated in the steering wheel 11 is suppressed if the ratio 1/α of the steering angle θs relative to the pinion angle θp is decreased, that is, the ratio α of the pinion angle θp relative to the steering angle θs is increased in the second steering assist mode.

Therefore, in the second steering assist mode of the vehicle steering control device 3 according to the first embodiment, the differential mechanism actuator target angle calculation unit 35 obtains the differential mechanism actuator target angle θdm* by applying a first ratio α1 of the pinion angle θp relative to the steering angle θs to the above Formula (3).

In addition, in the first steering assist mode of the vehicle steering control device 3 according to the first embodiment, the differential mechanism actuator target angle calculation unit 35 obtains the differential mechanism actuator target angle θdm* by applying a second ratio α2 set in accordance with an arbitrary vehicle speed Vt to the above Formula (3).

That is, the angle of the differential mechanism actuator 300 is controlled using the first ratio α1 of the pinion angle θp relative to the steering angle θs in the second steering assist mode, and the angle of the differential mechanism actuator 300 is controlled using the second ratio α2 in accordance with the vehicle speed Vt in the first steering assist mode. As a result, it is possible to implement the steering angle displacement suppression control in which the angular displacement of the steering angle θs is made smaller than the angular displacement of the pinion angle θp in the second steering assist mode, and it is possible to implement the appropriate steering assist control in accordance with the vehicle speed Vt in the first steering assist mode.

Hereinafter, an operation principle of the steering angle displacement suppression control in the second steering assist mode will be described from a viewpoint of each torque acting on the steerable shaft 12.

Figure 5:
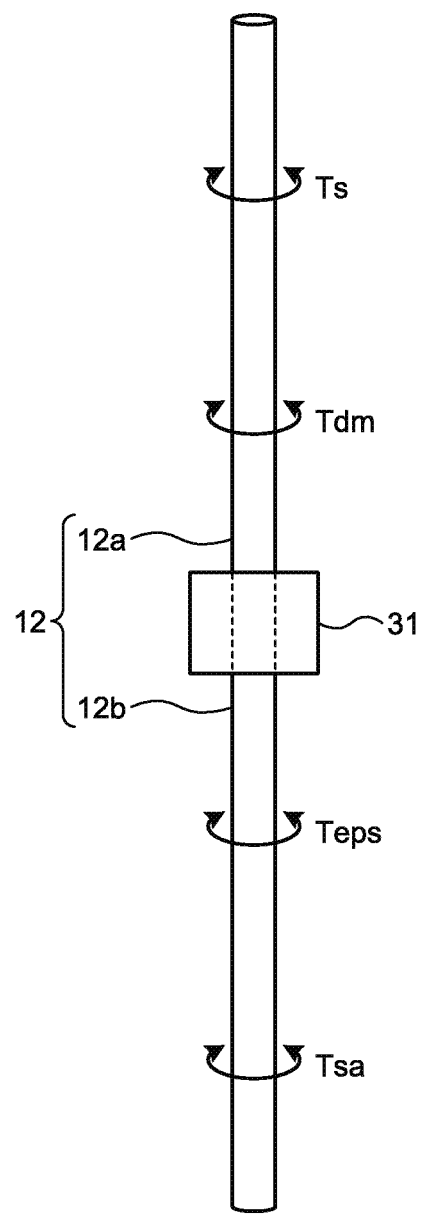
FIG. 5 is a view illustrating an example of a torque acting on a steerable shaft in a second steering assist mode of the vehicle steering control device according to the first embodiment.

FIG. 5 is a view illustrating an example of the torque acting on the steerable shaft in the second steering assist mode of the vehicle steering control device according to the first embodiment. As illustrated in FIG. 5, each torque, such as a steering torque Ts, a differential mechanism actuator torque Tdm generated by the differential mechanism actuator 300, an EPS actuator torque Teps obtained by converting an acceleration proportional to inertia applied from the EPS device 20 whose angle is controlled in the second steering assist mode, and a self-aligning torque Tsa acting on the vehicle 1 during traveling, acts on the steerable shaft 12.

In the second steering assist mode, the EPS actuator torque Teps converted from the acceleration proportional to inertia is generated by the angle control of the EPS actuator 200, and this EPS actuator torque Teps is transmitted via the pinion shaft 12b, the differential mechanism 31, and the steering shaft 12a to the steering wheel 11. When the EPS actuator torque Teps is larger than the steering torque Ts, angular displacement corresponding to a torque difference between the EPS actuator torque Teps and the steering torque Ts is generated in the steering wheel 11. That is, the pinion shaft 12b may serve as the input shaft of the differential mechanism 31, and the steering shaft 12a may serve as the output shaft of the differential mechanism 31 in the second steering assist mode.

The steering torque Ts, the differential mechanism actuator torque Tdm, the EPS actuator torque Teps, and the self-aligning torque Tsa are expressed by the following Formula (6).

$$Ts+Tdm=Teps+Tsa \quad (6)$$

When the above Formula (6) is transformed as an expression of the steering torque Ts, the following Formula (7) is obtained.

$$Ts=(Teps+Tsa)-Tdm \quad (7)$$

As is apparent from the above Formula (7), a torque (Teps+Tsa) obtained by adding the EPS actuator torque Teps and the self-aligning torque Tsa generated by the EPS device $20$ in the second steering assist mode is offset by the differential mechanism actuator torque Tdm that can be generated by the differential mechanism actuator $300$, so that the torque to be transmitted to the driver can be suppressed.

In addition, an angular displacement $\theta h$, caused by the respective torques including the steering torque Ts occurring on the steerable shaft $12$, the differential mechanism actuator torque Tdm, the EPS actuator torque Teps, and the self-aligning torque Tsa, is generated in the steering wheel $11$. At this time, an equation of motion around the steering wheel $11$ is given by the following Formula (8).

$$Ts+Tdm-(Teps+Tsa)=Jh \times d2\theta h/dt \quad (8)$$

When the above Formula (8) is transformed as an expression of the angular displacement $\theta h$, the following Formula (9) is obtained.

$$\theta h=ff\{Ts+Tdm-(Teps+Tsa)\}/Jh \quad (9)$$

As is apparent from the above Formula (9), the angular displacement $\theta h$, caused by the respective torques including the steering torque Ts occurring on the steerable shaft $12$, the differential mechanism actuator torque Tdm, the EPS actuator torque Teps, and the self-aligning torque Tsa, is generated in the steering wheel $11$. In addition, when the angular displacement $\theta h$ in the above Formula (9) is replaced with the steering angle $\theta s$, the steering angle $\theta s$ can be suppressed by offsetting the torque (Teps+Tsa) obtained by adding the EPS actuator torque Teps and the self-aligning torque Tsa generated by the EPS device $20$ in the second steering assist mode with the differential mechanism actuator torque Tdm that can be generated by the differential mechanism actuator $300$. In other words, it is possible to suppress the angular displacement the steering angle $\theta s$ in the second steering assist mode using the differential mechanism actuator torque Tdm.

As described above, the differential mechanism controller $34$ of the vehicle steering control device $3$ according to the present embodiment performs the angle control of the differential mechanism actuator $300$ by applying the first ratio $\alpha 1$ of the pinion angle $\theta p$ relative to the steering angle $\theta s$ which allows the angular displacement of the steering angle $\theta s$ to be smaller than the angular displacement of the pinion angle $\theta p$, in the second steering assist mode. At this time, the differential mechanism actuator $300$ obtains the differential mechanism actuator angle $\theta dm$ in a direction to cancel the EPS actuator torque Teps applied by the EPS device $20$ in the second steering assist mode, that is, in a direction opposite to the EPS actuator torque Teps such that the pinion angle $\theta p$ applied to the steerable shaft $12$ by the EPS actuator torque Teps is canceled. Accordingly, the differential mechanism actuator angle $\theta dm$ in a direction opposite to the pinion angle $\theta p$ generated by the EPS actuator torque Teps is generated, and as a result, the angular displacement of the steering angle $\theta s$ is suppressed, and it is possible to suppress the influence of the torque (EPS actuator torque Teps) generated in the second steering assist mode by the EPS device $20$ on the steering of the steering wheel $11$ performed by the driver. That is, in the vehicle steering control device $3$ according to the present embodiment, it is possible to implement the steering angle displacement suppression control in which the angular displacement of the steering angle $\theta s$ is made smaller than the angular displacement of the pinion angle $\theta p$ in the second steering assist mode.

In addition, the differential mechanism controller $34$ of the vehicle steering control device $3$ according to the present embodiment performs the angle control of the differential mechanism actuator $300$ by applying the second ratio $\alpha 2$ set in accordance with the arbitrary vehicle speed Vt in the first steering assist mode. As a result, in the vehicle steering control device $3$ according to the present embodiment, it is possible to implement the appropriate steering assist control in accordance with the vehicle speed Vt in the first steering assist mode.

Figure 6A:
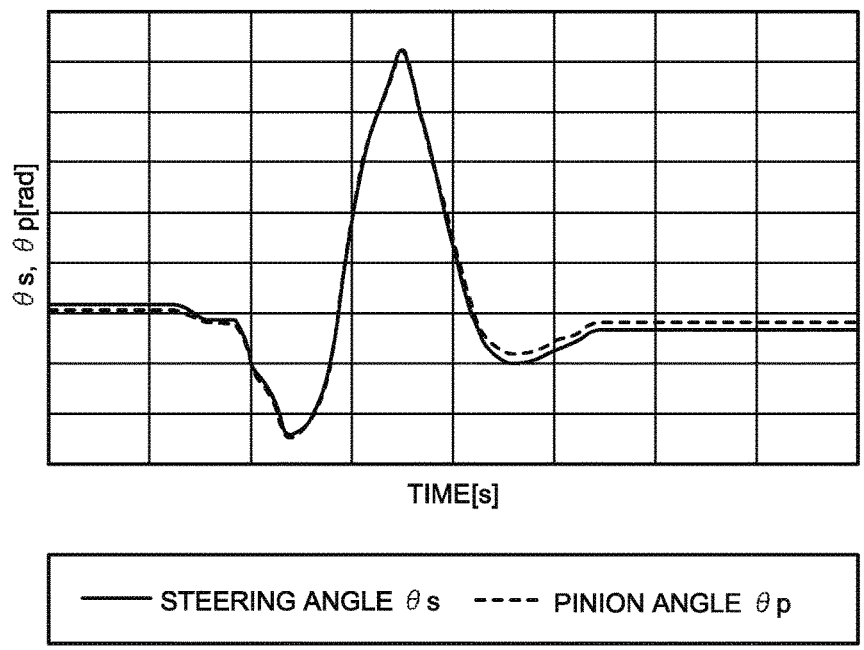
FIG. 6A is a graph illustrating transition examples of the steering angle θs and the pinion angle θp when a ratio α of the pinion angle θp relative to the steering angle θs is 1 (α=1) in the second steering assist mode of the vehicle steering control device according to the first embodiment.
Figure 6B:
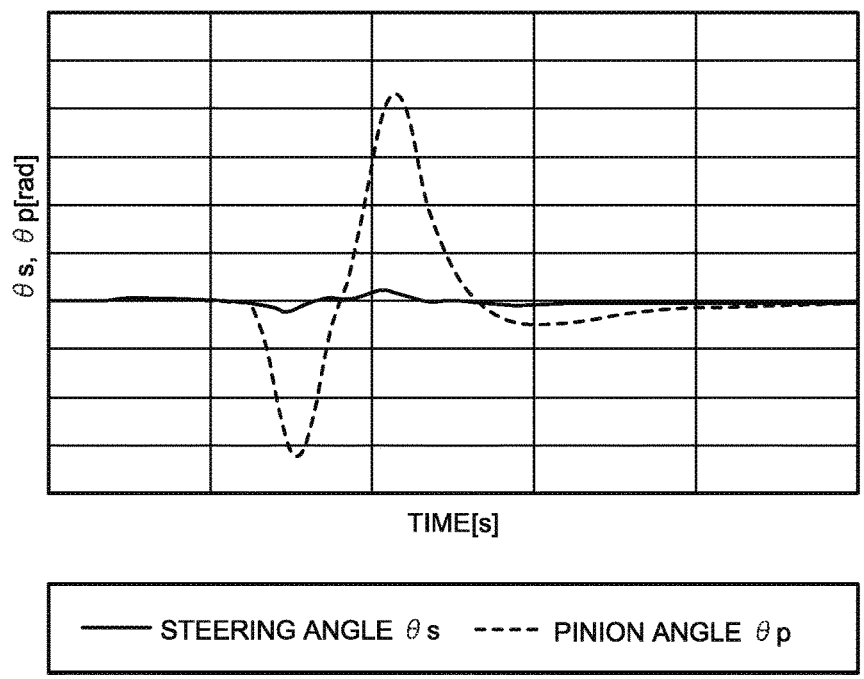
FIG. 6B is a graph illustrating transition examples of the steering angle θs and the pinion angle θp when the ratio α of the pinion angle θp relative to the steering angle θs is 20 (α=20) in the second steering assist mode of the vehicle steering control device according to the first embodiment.

FIG. 6A is a graph illustrating transition examples of the steering angle $\theta s$ and the pinion angle $\theta p$ when the ratio $\alpha$ of the pinion angle $\theta p$ relative to the steering angle $\theta s$ is 1 ($\alpha=1$) in the second steering assist mode of the vehicle steering control device according to the first embodiment. FIG. 6B is a graph illustrating transition examples of the steering angle $\theta s$ and the pinion angle $\theta p$ when the ratio $\alpha$ of the pinion angle $\theta p$ relative to the steering angle $\theta s$ is 20 ($\alpha=20$) in the second steering assist mode of the vehicle steering control device according to the first embodiment.

In the example illustrated in FIGS. 6A and 6B, simulation is performed assuming that an obstacle ahead of the vehicle is avoided using the second steering assist mode.

As illustrated in FIG. 6A, when the ratio $\alpha$ of the pinion angle $\theta p$ relative to the steering angle $\theta s$ is 1 ($\alpha=1$), a difference between a trajectory of the steering angle $\theta s$ and a trajectory of the pinion angle $\theta p$ is small.

On the other hand, when the ratio $\alpha$ of the pinion angle $\theta p$ relative to the steering angle $\theta s$ is 20 ($\alpha=20$) as illustrated in FIG. 6B, the pinion angle $\theta p$ is largely controlled by the EPS device $20$, but a trajectory of the steering angle $\theta s$ has a smaller wave height value than a trajectory of the pinion angle $\theta p$. That is, in the vehicle steering control device $3$ according to the present embodiment, it is possible to suppress the influence of the torque generated in the second steering assist mode by the EPS device $20$ on the steering of the steering wheel $11$ performed by the driver by applying the ratio $\alpha 2$ of the pinion angle $\theta p$ relative to the second steering angle $\theta s$, which is appropriately set as the ratio $\alpha$ of the pinion angle $\theta p$ relative to the steering angle $\theta s$, when the differential mechanism actuator target angle $\theta dm^*$ is obtained in the differential mechanism actuator target angle calculation unit $35$.

As described above, the vehicle steering control device $3$ according to the first embodiment includes: the EPS controller (first controller) $24$ for controlling the speed reduction mechanism $21$ and the differential mechanism controller (second controller) $34$ for controlling the differential mechanism $31$ in the steering mechanism $100$ in which the steering wheel $11$ and the rack-and-pinion $18$ which steers and drives each of the drive wheels 2FL and 2FR are connected via the differential mechanism $31$ and the speed reduction mechanism $21$ is provided between the rack-and-pinion $18$ and each of the drive wheels 2FL and 2FR.

In addition, the vehicle steering control device $3$ according to the first embodiment has the first steering assist mode of assisting the driver's steering and the second steering assist mode of performing the automatic steering independently from the driver's steering as the operation modes of the EPS controller (first controller) 24 and the differential mechanism controller (second controller) 34.

The differential mechanism controller (second controller) 34 performs the angle control of the differential mechanism 31 so as to cancel the angular displacement generated by the torque applied to the pinion shaft 12b of the steerable shaft 12 (on the rack-and-pinion 18 side of the differential mechanism 31) from the speed reduction mechanism 21 controlled by the EPS controller (first controller) 24 in the second steering assist mode.

More specifically, the differential mechanism controller (second controller) 34 performs the angle control of the differential mechanism 31 such that the angular displacement of the steering angle θs is smaller than the angular displacement of the pinion angle θp in the second steering assist mode.

At this time, the differential mechanism 31 of the differential mechanism actuator 300 obtains the differential mechanism actuator angle θdm in a direction to cancel the EPS actuator torque Teps applied by the speed reduction device 21 of the EPS device 20 in the second steering assist mode, that is, in a direction opposite to the EPS actuator torque Teps such that the pinion angle θp applied to the steerable shaft 12 by the EPS actuator torque Teps is canceled. Accordingly, the differential mechanism actuator angle θdm in a direction opposite to the pinion angle θp generated by the EPS actuator torque Teps is generated, and as a result, the angular displacement of the steering angle θs is suppressed, and it is possible to suppress the influence of the torque (EPS actuator torque Teps) generated in the second steering assist mode by the EPS device 20 on the steering of the steering wheel 11 performed by the driver.

In addition, in the above configuration, the first ratio of the steering angle θs (angle on the steering wheel 11 side of the differential mechanism 31) relative to the pinion angle θp (angle on the rack-and-pinion 18 side of the differential mechanism 31) is set, and the differential mechanism controller (second controller) 34 can cancel the angular displacement generated by the torque applied to the pinion shaft 12b (on the rack-and-pinion 18 side of the differential mechanism 31) of the steerable shaft 12 from the speed reduction mechanism 21 controlled by the EPS controller (first controller) 24 by performing the angle control of the differential mechanism 31 based on (the angle on the side of the steering wheel 11 of the differential mechanism 31) and the first ratio of the steering angle θs relative to the pinion angle θp.

In addition, the differential mechanism controller (second controller) 34 performs the angle control of the differential mechanism 31 based on the steering angle θs (the angle on the side of the steering wheel 11 of the differential mechanism 31) and the second ratio set in accordance with the vehicle speed Vt in the first steering assist mode. That is, the first ratio and the second ratio are switched to perform the angle control of the differential mechanism 31 in the second steering assist mode and the first steering assist mode. As a result, it is possible to implement the steering angle displacement suppression control in which the angular displacement of the steering angle θs is made smaller than the angular displacement of the pinion angle θp in the second steering assist mode, and it is possible to implement the appropriate steering assist control in accordance with the vehicle speed Vt in the first steering assist mode.

Incidentally, the example in which the EPS controller (first controller) 24 is incorporated in the EPS control unit 23 and the differential mechanism control unit (second control unit) 34 is incorporated in the differential mechanism control unit 33 has been described in the above-described first embodiment, but it may be configured such that the EPS controller (first controller) 24 and the differential mechanism controller (second controller) 34 are incorporated in the same control unit, or the EPS control unit 23 and the differential mechanism control unit 33 may be configured as one control unit. The present invention is not limited by the configurations of such control units and the physical configurations of the EPS controller (first controller) 24 and the differential mechanism controller (second controller) 34.

Second Embodiment

Figure 7:
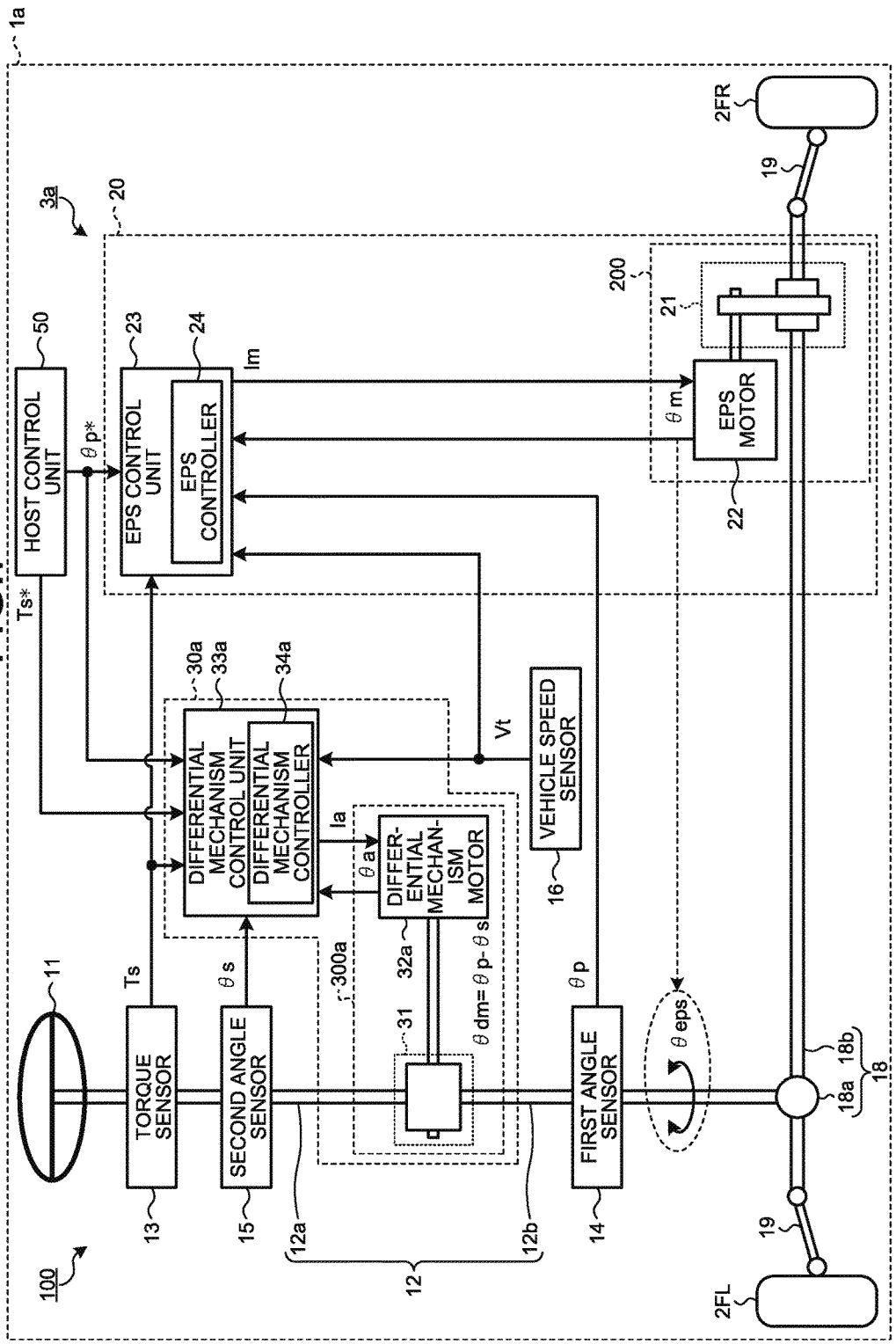
FIG. 7 is a diagram illustrating a configuration example of a vehicle steering control device according to a second embodiment.

FIG. 7 is a diagram illustrating a configuration example of a vehicle steering control device according to a second embodiment. Incidentally, a configuration of the EPS controller 24 of the vehicle steering control device according to the second embodiment in a vehicle 1a illustrated in FIG. 7 is the same as that of the first embodiment described above, and thus, the description thereof will be omitted here.

A vehicle steering control device 3a switches from the first steering assist mode to the second steering assist mode as the target pinion angle θp* and a target steering torque Ts* are input from the automatic steering control unit (host control unit) 50. Incidentally, the vehicle steering control device 3a may be configured such that a signal for switching between the first steering assist mode and the second steering assist mode is input from the automatic steering control unit (host control unit) 50 other than the target pinion angle θp* and the target steering torque Ts*.

A differential device 30a is configured to include the differential mechanism 31, a differential mechanism motor 32a, and a differential mechanism control unit 33a. The differential mechanism 31 and the differential mechanism motor 32a constitute a differential mechanism actuator 300a.

The differential mechanism control unit 33a includes a differential mechanism controller (second control unit) 34a for controlling the differential mechanism 31. As the differential mechanism controller 34a performs current control of the differential mechanism motor 32a, an angular difference θdm is generated by the differential mechanism 31 provided between the pinion shaft 12b and the steering shaft 12a.

FIG. 8 is a diagram illustrating an example of an internal functional configuration of the differential mechanism controller of the vehicle steering control device according to the second embodiment.

The differential mechanism controller 34a is configured to include a first differential mechanism motor command value generation unit 45, a second differential mechanism motor command value generation unit 46, a differential mechanism motor current command value switching unit 47, and a differential mechanism motor current control unit 48.

The first differential mechanism motor command value generation unit 45 is configured to include a differential mechanism motor target angle calculation unit 451, an adder 452, and a first differential mechanism motor current command value calculation unit 453.

The second differential mechanism motor command value generation unit 46 is configured to include an adder 461, a differential mechanism actuator torque command value calculation unit 462, and a second differential mechanism motor current command value calculation unit 463.

The differential mechanism actuator torque command value calculation unit 462 is configured to include, for example, a phase compensator 464 and a controller 465. For example, the controller 465 may be a PI controller or a P controller.

The vehicle speed Vt detected by the vehicle speed sensor 16, the steering angle θs detected by the second angle sensor 15, the absolute angle (differential mechanism motor angle) θa of the differential mechanism motor 32a, the steering torque Ts detected by the torque sensor 13, the target pinion angle θp* from the automatic steering control unit (host control unit) 50, and the target steering torque Ts* are input to the differential mechanism controller 34a.

The differential mechanism controller 34a according to the present embodiment implements steering assist control in accordance with the vehicle speed Vt in the first steering assist mode, and implements steering angle displacement suppression control to suppress angular displacement generated in the steering angle θs by torque control of the EPS actuator 200 in the second steering assist mode.

In the first steering assist mode, the differential mechanism motor target angle calculation unit 451 of the first differential mechanism motor command value generation unit 45 obtains an angle command (differential mechanism actuator target angle θdm*) in the differential mechanism actuator 300a based on the vehicle speed Vt and the steering angle θs. Further, the differential mechanism motor target angle calculation unit 451 obtains a differential mechanism motor target angle θa* corresponding to the obtained differential mechanism actuator target angle θdm* and outputs the obtained differential mechanism motor target angle θa* to the adder 452.

The adder 452 obtains an angular deviation Δθa between the differential mechanism motor target angle θa* output from the differential mechanism motor target angle calculation unit 451 and the differential mechanism motor angle θa, and outputs the obtained angular deviation Δθa to the first differential mechanism motor current command value calculation unit 453.

The first differential mechanism motor current command value calculation unit 453 obtains a current command value (first differential mechanism motor current command value) Ia1* of the differential mechanism motor 32a necessary to offset the angular deviation Δθa between the differential mechanism motor target angle θa* and the differential mechanism motor angle θa, and outputs the obtained current command value Ia1* to the differential mechanism motor current command value switching unit 47.

On the other hand, in the second steering assist mode, the adder 461 of the second differential mechanism motor command value generation unit 46 obtains a deviation ΔTs between the target steering torque Ts* from the automatic steering control unit (host control unit) 50 and the steering torque Ts detected by the torque sensor 13, and outputs the obtained deviation ΔTs to the differential mechanism actuator torque command value calculation unit 462.

The differential mechanism actuator torque command value calculation unit 462 obtains a differential mechanism actuator torque command value Tdm* based on the deviation ΔTs between the target steering torque Ts* and the steering torque Ts, which has been input from the adder 461, and outputs the obtained differential mechanism actuator torque command value Tdm* to the second differential mechanism motor current command value calculation unit 463. Incidentally, the example in which the differential mechanism actuator torque command value calculation unit 462 is configured to include the phase compensator 464 and the controller 465 is illustrated in the example illustrated in FIG. 8, but the configuration of the differential mechanism actuator torque command value calculation unit 462 is not limited thereto, and the present invention is not limited by the configuration of the differential mechanism actuator torque command value calculation unit 462.

The second differential mechanism motor current command value calculation unit 463 obtains a current command value (second differential mechanism motor current command value) Ia2* of the differential mechanism motor 32a necessary to obtain the differential mechanism actuator torque command value Tdm*, and outputs the obtained current command value Ia2* to the differential mechanism motor current command value switching unit 47.

The differential mechanism motor current command value switching unit 47 switches the first differential mechanism motor current command value Ia1* output from the first differential mechanism motor current command value calculation unit 453 and the second differential mechanism motor current command value Ia2* output from the second differential mechanism motor current command value calculation unit 463 in accordance with the target pinion angle θp* to be output as the differential mechanism motor current command value Ia*. More specifically, when the target pinion angle θp* has not been input from the automatic steering control unit (host control unit) 50, the differential mechanism motor current command value switching unit 47 outputs the first differential mechanism motor current command value Ia1* to the differential mechanism motor current control unit 48 as the differential mechanism motor current command value Ia* assuming that the operation mode is the first steering assist mode. In addition, when the target pinion angle θp* has been input from the automatic steering control unit (host control unit) 50, the differential mechanism motor current command value switching unit 47 outputs the second differential mechanism motor current command value Ia2* to the differential mechanism motor current control unit 48 as the differential mechanism motor current command value Ia* assuming that the operation mode is the second steering assist mode.

The differential mechanism motor current control unit 48 generates the differential mechanism motor current Ia in accordance with the differential mechanism motor current command value Ia* output from the differential mechanism motor current command value switching unit 47 and applies the generated differential mechanism motor current Ia to the differential mechanism motor 32a.

An operation concept of the differential mechanism controller 34a in the first steering assist mode and an operation principle of the steering angle displacement suppression control in the second steering assist mode in the vehicle steering control device according to the second embodiment are the same as those in the first embodiment, and thus, the description thereof will be omitted here.

The differential mechanism controller 34a of the vehicle steering control device 3a according to the present embodiment performs the angle control of the differential mechanism actuator 300a by applying the ratio α of the pinion angle θp relative to the steering angle θs in accordance with the vehicle speed Vt in the first steering assist mode. In addition, the differential mechanism controller 34a performs the torque control of the differential mechanism actuator 300a so as to reduce the deviation ΔTs between the target steering torque Ts* and the steering torque Ts applied from the automatic steering control unit (host control unit) 50 in the second steering assist mode. At this time, the differential mechanism actuator 300a obtains the differential mechanism actuator angle θdm in a direction to cancel the EPS actuator torque Teps applied by the speed reduction device 21 of the EPS device 20 in the second steering assist mode, that is, in a direction opposite to the EPS actuator torque Teps such that the pinion angle θp applied to the steerable shaft 12 by the EPS actuator torque Teps is canceled. Accordingly, the differential mechanism actuator angle θdm in a direction opposite to the pinion angle θp generated by the EPS actuator torque Teps is generated, and as a result, the angular displacement of the steering angle θs is suppressed, and it is possible to suppress the influence of the torque (EPS actuator torque Teps) generated in the second steering assist mode by the EPS device 20 on the steering of the steering wheel 11 performed by the driver.

Figure 9A:
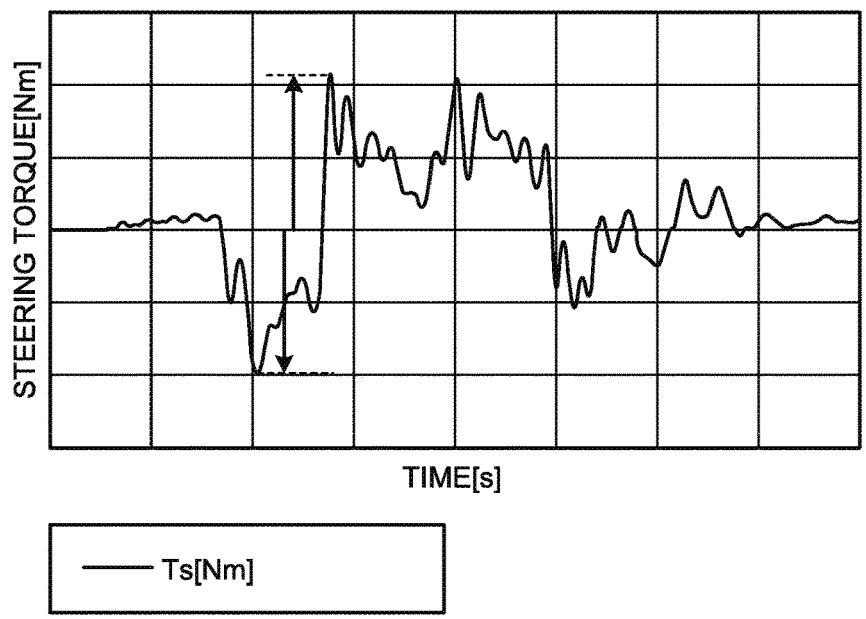
FIG. 9A is a graph illustrating a transition example in a case where steering angle displacement suppression control by torque control is not applied in the second steering assist mode of the vehicle steering control device according to the second embodiment.
Figure 9B:
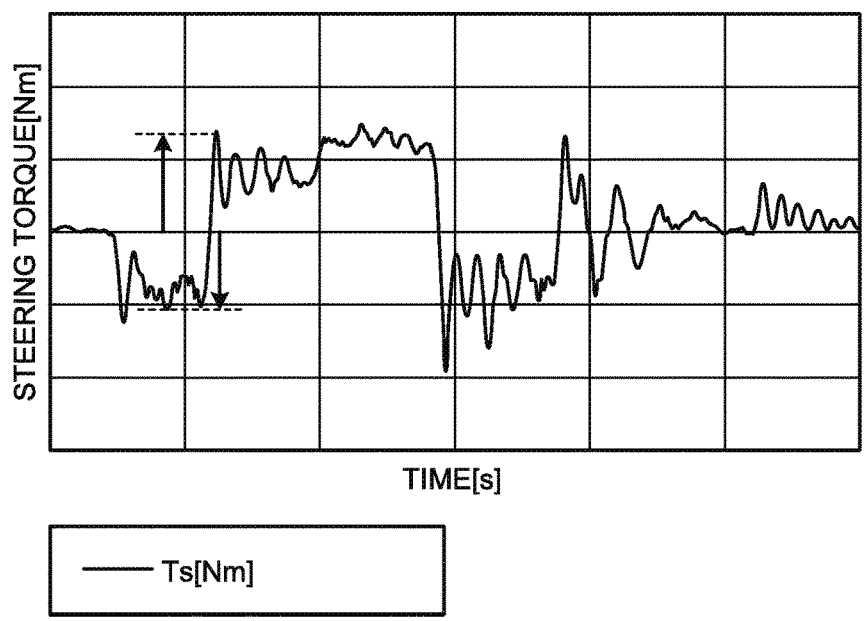
FIG. 9B is a graph illustrating a transition example in a case where the steering angle displacement suppression control by the torque control is applied in the second steering assist mode of the vehicle steering control device according to the second embodiment.

FIG. 9A is a graph illustrating a transition example in a case where steering angle displacement suppression control by torque control is not applied in the second steering assist mode of the vehicle steering control device according to the second embodiment. FIG. 9B is a graph illustrating a transition example in a case where the steering angle displacement suppression control by the torque control is applied in the second steering assist mode of the vehicle steering control device according to the second embodiment.

In the example illustrated in FIGS. 9A and 9B, simulation is performed assuming that an obstacle ahead of the vehicle is avoided using the second steering assist mode.

As illustrated in FIG. 9B, the amplitude of the steering torque Ts is smaller in the case of applying the steering angle displacement suppression control using the torque control according to the second embodiment than in the case of not applying the steering angle displacement suppression control using the torque control according to the second embodiment (FIG. 9A). That is, in the vehicle steering control device 3a according to the present embodiment, it is possible to suppress the influence of the torque generated in the second steering assist mode by the EPS device 20 on the steering of the steering wheel 11 performed by the driver by appropriately setting the target steering torque Ts* to be input from the automatic steering control unit (host control unit) 50 and superimposing the differential mechanism actuator angle θdm in the direction opposite to the EPS actuator torque Teps in the direction of canceling the EPS actuator torque Teps applied by the speed reduction device 21 of the EPS device 20 in the first steering assist mode, that is, so as to cancel the pinion angle θp to be applied to the steerable shaft 12 by the EPS actuator torque Teps.

Incidentally, the target steering torque Ts* has been described as being applied from the automatic steering control unit (host control unit) 50 in the above example, but may be set in the second differential mechanism motor command value generation unit 46 in advance as a set value, or may be configured to be stored in a storage unit (not illustrated) provided in the differential mechanism control unit 33a to be read by the second differential mechanism motor command value generation unit 46 at the time of switching from the first steering assist mode to the second steering assist mode.

As described above, the differential mechanism controller (second controller) 34a of the vehicle steering control device 3a according to the second embodiment performs torque control of the differential mechanism 31 so as to cancel the torque applied to the pinion shaft 12b of the steerable shaft 12 (on the rack-and-pinion 18 side of the differential mechanism 31) from the speed reduction mechanism 21 controlled by the EPS controller (first controller) 24 in the second steering assist mode.

At this time, the differential mechanism 31 of the differential mechanism actuator 300a obtains the differential mechanism actuator angle θdm in a direction to cancel the EPS actuator torque Teps applied by the speed reduction device 21 of the EPS device 20 in the second steering assist mode, that is, in a direction opposite to the EPS actuator torque Teps such that the pinion angle θp applied to the steerable shaft 12 by the EPS actuator torque Teps is canceled. Accordingly, the differential mechanism actuator angle θdm in a direction opposite to the pinion angle θp generated by the EPS actuator torque Teps is generated, and as a result, the angular displacement of the steering angle θs is suppressed, and it is possible to suppress the influence of the torque (EPS actuator torque Teps) generated in the second steering assist mode by the EPS device 20 on the steering of the steering wheel 11 performed by the driver.

In addition, in the above configuration, the differential mechanism controller (second controller) 34a can cancel the torque applied to the rack-and-pinion 18 side of the differential mechanism 31 from the speed reduction mechanism 21 controlled by the EPS controller (first controller) 24 by performing the torque control of the differential mechanism 31 such that the steering torque Ts generated in the steering wheel 11 becomes the predetermined target steering torque Ts*.

Incidentally, the example in which the EPS controller (first controller) 24 is incorporated in the EPS control unit 23 and the differential mechanism controller (second controller) 34a is incorporated in the differential mechanism control unit 33a has been described in the above-described second embodiment, but it may be configured such that the EPS controller (first controller) 24 and the differential mechanism controller (second controller) 34a may be incorporated in the same control unit, or the EPS control unit 23 and the differential mechanism control unit 33a may be configured as one control unit. The present invention is not limited by the configurations of such control units and the physical configurations of the EPS controller (first controller) 24 and the differential mechanism controller (second controller) 34a.

REFERENCE SIGNS LIST 1, 1a VEHICLE
2FL LEFT DRIVE WHEEL
2FR RIGHT DRIVE WHEEL
3, 3a VEHICLE STEERING CONTROL DEVICE
11 STEERING WHEEL
12 STEERABLE SHAFT
12a STEERING SHAFT
12b PINION SHAFT
13 TORQUE SENSOR
14 FIRST ANGLE SENSOR
15 SECOND ANGLE SENSOR
16 VEHICLE SPEED SENSOR
18 RACK-AND-PINION
18a PINION
18b RACK
19 TIE ROD
20 EPS DEVICE
21 SPEED REDUCTION MECHANISM
22 EPS MOTOR
23 EPS CONTROL UNIT
24 EPS CONTROLLER (FIRST CONTROLLER)
25 EPS ASSIST CONTROL UNIT
26 EPS MOTOR ANGLE CONTROL UNIT
27 EPS MOTOR CURRENT COMMAND VALUE SWITCHING UNIT
28 EPS MOTOR CURRENT CONTROL UNIT
30, 30a DIFFERENTIAL DEVICE

31 DIFFERENTIAL MECHANISM
32, 32a DIFFERENTIAL MECHANISM MOTOR
33, 33a DIFFERENTIAL MECHANISM CONTROL UNIT
34, 34a DIFFERENTIAL MECHANISM CONTROLLER (SECOND CONTROLLER)
35 DIFFERENTIAL MECHANISM ACTUATOR TARGET ANGLE CALCULATION UNIT
36 ADDER
37 ADDER
38 DIFFERENTIAL MECHANISM ACTUATOR POSITION CONTROL UNIT
39 DIFFERENTIAL MECHANISM MOTOR CURRENT CONTROL UNIT
45 FIRST DIFFERENTIAL MECHANISM MOTOR COMMAND VALUE GENERATION UNIT
46 SECOND DIFFERENTIAL MECHANISM MOTOR COMMAND VALUE GENERATION UNIT
47 DIFFERENTIAL MECHANISM MOTOR CURRENT COMMAND VALUE SWITCHING UNIT
48 DIFFERENTIAL MECHANISM MOTOR CURRENT CONTROL UNIT
50 HOST CONTROL UNIT (AUTOMATIC STEERING CONTROL UNIT)
100 STEERING MECHANISM
200 EPS ACTUATOR
251 EPS MOTOR ASSIST TORQUE CALCULATION UNIT
252 FIRST EPS MOTOR CURRENT COMMAND VALUE CALCULATION UNIT
261 EPS MOTOR TARGET ANGLE CALCULATION UNIT
262 ADDER
263 SECOND EPS MOTOR CURRENT COMMAND VALUE CALCULATION UNIT
300, 300a DIFFERENTIAL MECHANISM ACTUATOR
451 DIFFERENTIAL MECHANISM MOTOR TARGET ANGLE CALCULATION UNIT
452 ADDER
453 FIRST DIFFERENTIAL MECHANISM MOTOR CURRENT COMMAND VALUE CALCULATION UNIT
461 ADDER
462 DIFFERENTIAL MECHANISM ACTUATOR TORQUE COMMAND VALUE CALCULATION UNIT
463 SECOND DIFFERENTIAL MECHANISM MOTOR CURRENT COMMAND VALUE CALCULATION UNIT
464 PHASE COMPENSATOR 465 CONTROLLER
Ia DIFFERENTIAL MECHANISM MOTOR CURRENT
Ia* DIFFERENTIAL MECHANISM MOTOR CURRENT COMMAND VALUE
Im EPS MOTOR CURRENT
Im* EPS MOTOR CURRENT COMMAND VALUE
Im1* FIRST EPS MOTOR CURRENT COMMAND VALUE
Im2* SECOND EPS MOTOR CURRENT COMMAND VALUE
Ta ASSIST TORQUE
Tdm DIFFERENTIAL MECHANISM ACTUATOR TORQUE
Tdm* DIFFERENTIAL MECHANISM ACTUATOR TORQUE COMMAND VALUE
Teps EPS ACTUATOR TORQUE
Ts STEERING TORQUE
Tsa SELF-ALIGNING TORQUE
Ts* TARGET STEERING TORQUE
$\alpha$ RATIO OF PINION ANGLE $\theta p$ RELATIVE TO STEERING ANGLE $\theta s$
$\alpha 1$ FIRST RATIO
$\alpha 2$ SECOND RATIO
$\theta a$ DIFFERENTIAL MECHANISM MOTOR ANGLE
$\theta a^*$ DIFFERENTIAL MECHANISM MOTOR TARGET ANGLE
$\theta dm$ DIFFERENTIAL MECHANISM ACTUATOR ANGLE
$\theta dm^*$ DIFFERENTIAL MECHANISM ACTUATOR TARGET ANGLE
$\theta eps$ EPS ACTUATOR ANGLE
$\theta eps^*$ EPS ACTUATOR TARGET ANGLE
$\theta h$ ANGULAR DISPLACEMENT
$\theta m$ EPS MOTOR ANGLE
$\theta m^*$ EPS MOTOR TARGET ANGLE
$\theta s$ STEERING ANGLE
$\theta p$ PINION ANGLE
$\theta p^*$ TARGET PINION ANGLE
$\Delta\theta a$ ANGULAR DEVIATION (DIFFERENTIAL MECHANISM MOTOR)
$\Delta\theta m$ ANGULAR DEVIATION (EPS MOTOR)

The invention claimed is:

1. A vehicle steering control device in a steering mechanism in which a steering wheel and a rack-and-pinion that steers and drives a drive wheel are connected via a differential mechanism and a speed reduction mechanism is provided in a rack of the rack-and-pinion, the vehicle steering control device comprising:
a pinion shaft provided on a side of the rack-and-pinion of the differential mechanism;
a steering shaft provided on a side of the steering wheel of the differential mechanism;
a first angle sensor that is provided on the pinion shaft and detects a pinion angle which is a mechanical angle of the pinion shaft;
a second angle sensor that is provided on the steering shaft and detects a steering angle which is a mechanical angle of the steering shaft;
a first controller that controls the speed reduction mechanism; and
a second controller that controls the differential mechanism,
wherein
a first steering assist mode of assisting steering of a driver and a second steering assist mode of performing steering independently from the steering of the driver are provided as operation modes of the first controller and the second controller, and
the second controller controls the differential mechanism in the second steering assist mode such that a first ratio is set such that displacement of the steering angle is smaller than displacement of the pinion angle and a ratio of the pinion angle relative to the steering angle becomes the first ratio.

2. The vehicle steering control device according to claim 1, further comprising
a vehicle speed sensor that detects a vehicle speed,
wherein
the second controller controls the differential mechanism in the first steering assist mode such that a second ratio different from the first ratio is set in accordance with the vehicle speed and the ratio of the pinion angle relative to the steering angle becomes the second ratio.

3. A vehicle steering control device in a steering mechanism in which a steering wheel and a rack-and-pinion that steers and drives a drive wheel are connected via a differential mechanism and a speed reduction mechanism is provided in a rack of the rack-and-pinion, the vehicle steering control device comprising:
- a pinion shaft provided on a side of the rack-and-pinion of the differential mechanism;
- a steering shaft provided on a side of the steering wheel of the differential mechanism;
- a first angle sensor that is provided on the pinion shaft and detects a pinion angle which is a mechanical angle of the pinion shaft;
- a second angle sensor that is provided on the steering shaft and detects a steering angle which is a mechanical angle of the steering shaft;
- a torque sensor that is provided on the steering shaft and detects a steering torque applied to the steering shaft;
- a first controller that controls the speed reduction mechanism; and
- a second controller that controls the differential mechanism, wherein
- a first steering assist mode of assisting steering of a driver and a second steering assist mode of performing steering independently from the steering of the driver are provided as operation modes of the first controller and the second controller, and
- the second controller controls the differential mechanism in the second steering assist mode such that a target steering torque is set so as to cancel a torque applied to the pinion shaft when the speed reduction mechanism is controlled by the first controller and a deviation between the steering torque and the target steering torque decreases.

4. The vehicle steering control device according to claim 3, further comprising
- a vehicle speed sensor that detects a vehicle speed,
- wherein, in the first steering assist mode, a ratio of the pinion angle relative to the steering angle is set in accordance with the vehicle speed, and
- the second controller controls the differential mechanism in accordance with the ratio.

* * * * *